(12) United States Patent
Song et al.

(10) Patent No.: US 11,245,838 B2
(45) Date of Patent: Feb. 8, 2022

(54) SHOOTING METHOD FOR SHOOTING DEVICE, AND ELECTRONIC EQUIPMENT

(71) Applicant: Chengdu Sioeye Technology Co., Ltd., Sichuan (CN)

(72) Inventors: Wenlong Song, Sichuan (CN); Zhongqiang Du, Sichuan (CN)

(73) Assignee: CHENGDU SIOEYE TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 16/778,051

(22) Filed: Jan. 31, 2020

(65) Prior Publication Data

US 2020/0252541 A1 Aug. 6, 2020

(30) Foreign Application Priority Data

Feb. 3, 2019 (CN) .......................... 201910108568.8
Feb. 3, 2019 (CN) .......................... 201910108582.8
Feb. 3, 2019 (CN) .......................... 201910108583.2

(51) Int. Cl.
*H04N 5/232* (2006.01)

(52) U.S. Cl.
CPC ..... *H04N 5/23219* (2013.01); *H04N 5/23206* (2013.01); *H04N 5/23222* (2013.01); *H04N 5/23251* (2013.01)

(58) Field of Classification Search
None
See application file for complete search history.

(56) References Cited

U.S. PATENT DOCUMENTS 10,555,393 B1\* 2/2020 Fu .......................... H05B 47/19
2011/0150273 A1\* 6/2011 Moore ............... G06K 9/00664
382/103

(Continued)

FOREIGN PATENT DOCUMENTS

CN 101216881 A 7/2008
CN 101360228 A 2/2009

(Continued)

OTHER PUBLICATIONS

Notification of Grant dated Mar. 1, 2021 for corresponding CN Patent Application No. 201910108583.2 and English translation thereof.

*Primary Examiner* — James M Hannett
(74) *Attorney, Agent, or Firm* — Tarolli, Sundheim, Covell & Tummino LLP

(57) ABSTRACT

A shooting method for a shooting device and an electronic equipment are provided, and the method including: a shooting device in a standby state detecting motion data and judging if the shooting device meets a starting condition according to the motion data, and starting the shooting device and beginning detecting faces if the shooting device meets the starting condition; determining, at least based on a situation of face detected by the shooting device, whether to start the shooting device to begin shooting a video, and recording face feature information corresponding to the video; and uploading, according to an uploading condition, the face feature information and the shot video corresponding to the face feature information to a server after the shooting is completed.

15 Claims, 3 Drawing Sheets

(56) References Cited

U.S. PATENT DOCUMENTS

2015/0341548 A1* 11/2015 Petrescu ................ H04N 1/212
  348/207.1
2017/0328997 A1* 11/2017 Silverstein ............ G01S 13/765
2017/0332050 A1* 11/2017 Yamashita ......... H04N 5/23293

FOREIGN PATENT DOCUMENTS

| CN | 101646017 A | 2/2010 |
| CN | 105049712 A | 11/2015 |
| CN | 105357475 A | 2/2016 |
| CN | 105868309 A | 8/2016 |
| CN | 105872717 A | 8/2016 |
| CN | 106791424 A | 5/2017 |
| CN | 106940597 A | 7/2017 |
| CN | 107346426 A | 11/2017 |
| CN | 107370938 A | 11/2017 |
| JP | 2004304653 A | 10/2004 |

* cited by examiner

SHOOTING METHOD FOR SHOOTING DEVICE, AND ELECTRONIC EQUIPMENT

CROSS REFERENCE TO RELATED APPLICATIONS

The present disclosure claims priorities of Chinese Patent Application No. 201910108583.2, filed with the Chinese Patent Office on Feb. 3, 2019 and entitled "Shooting Method, Device, Equipment and Medium" and Chinese Patent Application No. 201910108568.8, filed with the Chinese Patent Office on Feb. 3, 2019 and entitled "Method, Device, Equipment and Medium for Shooting and Playing Video" and Chinese Patent Application No. 201910108582.8, filed with the Chinese Patent Office on Feb. 3, 2019 and entitled "Method, Device, Equipment and Medium for Shooting and Playing", the contents of which are incorporated herein by reference in their entireties.

TECHNICAL FIELD

The present disclosure relates to the technical field of electronics, in particular to a shooting method for a shooting device and an electronic equipment.

BACKGROUND

In conventional methods using face recognition technologies for video shooting and analysis, generally the face recognition module and the video shooting module need to be kept in a running state for a long period of time so as to acquire face data and corresponding video data, and the acquired data is transmitted to a server to support the face searching and analysis after the shooting.

On the one hand, the long time running of the face recognition module and the video shooting module will result in a relatively large energy consumption of the equipment, on the other hand, a large quantity of video data with and without faces is transmitted to the server for storage, which not only consumes the network traffic of the equipment, but also occupies a large amount of storage space of the server.

However, in certain scenarios, for example, when the shooting follows one or a limited number of individuals in motion, the traditional shooting scheme cannot meet the demands from the aspects of equipment power consumption, network traffic and storage cost, etc.

SUMMARY

Embodiments of the present disclosure provide a shooting method for a shooting device and an electronic equipment for solving at least a part of the above mentioned technical solutions.

Embodiments of the present disclosure provide a shooting method, including steps of:

A shooting device in a standby state detecting motion data and judging if the shooting device meets a starting condition according to the motion data; starting the shooting device and beginning detecting faces if the shooting device meets the starting condition;

determining, at least based on a situation of face detected by the shooting device, whether to start the shooting device to begin shooting a video, and recording face feature information corresponding to the video;

Uploading, according to an uploading condition, the face feature information and the shot video corresponding to the face feature information to a server after the shooting is completed.

The above description is merely a brief introduction of the technical solutions of the present disclosure which is given for enabling better understanding of technical means of the present disclosure and for implementations according to the contents of the specification. In order to make the above and other objects, features and advantages of the present disclosure more apparent and understandable, specific embodiments of the present disclosure are given below.

BRIEF DESCRIPTION

Through reading the detailed description of preferred embodiments to be described below, various other advantages and benefits will become clear to those skilled in the art. The appended drawings are intended only to illustrate the preferred embodiments and are not construed as limitations on the present disclosure. Throughout the drawings, same reference signs denote same components. Among the drawings.

DETAILED DESCRIPTION

Figure 1:
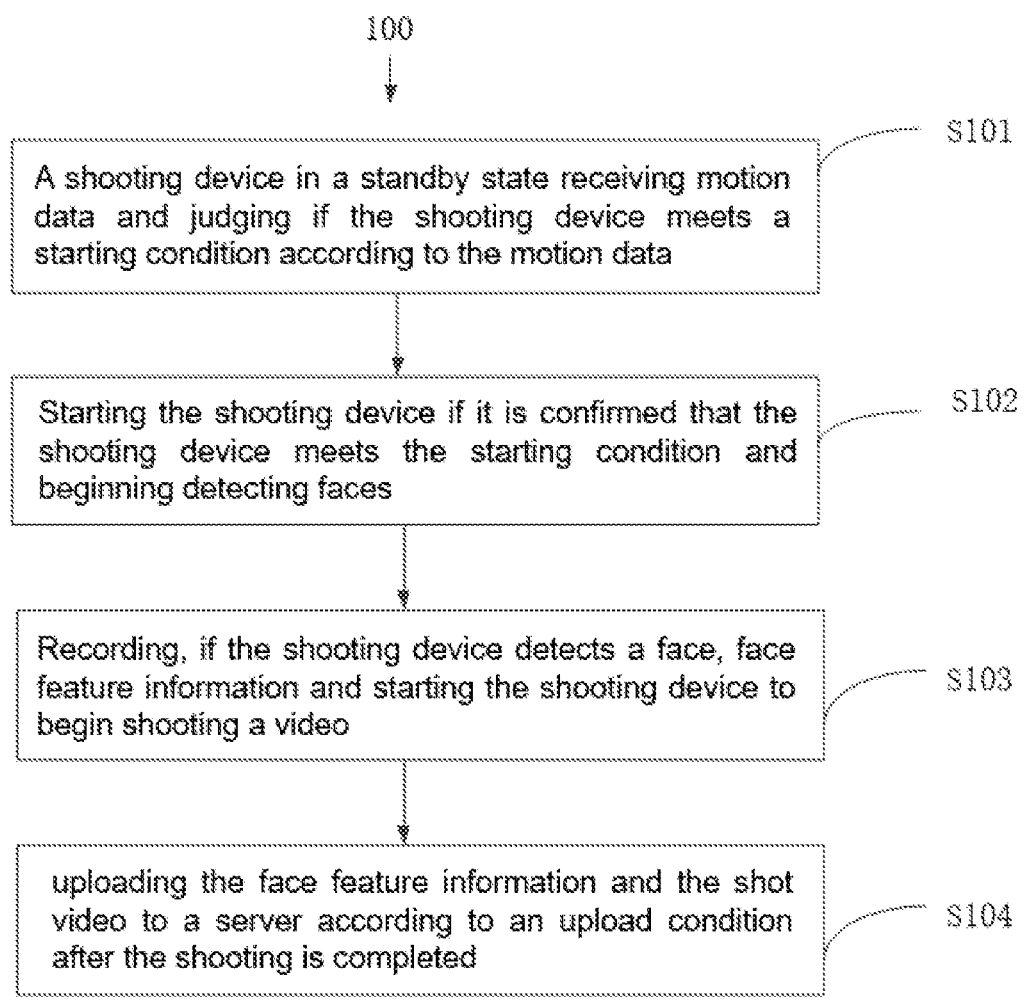
FIG. 1 is a flowchart of a shooting method according to embodiments of the present disclosure.

Technical solutions of the present disclosure are to be described in detailed with reference to the drawings and detailed embodiments, it should be understood that the embodiments of the present disclosure and the specific features in the embodiments are detailed descriptions of the technical solutions of the present disclosure, rather than limitations on the technical solutions of the present disclosure, and the embodiments of the present disclosure and the technical features in the embodiments can be combined with one another without conflict.

Embodiments of the present disclosure provide a shooting method for a shooting device, comprising:

a shooting device in a standby state detecting motion data and judging if the shooting device meets a starting condition according to the motion data; starting the shooting device and beginning detecting faces if the shooting device meets the starting condition;

determining, at least based on a situation of face detected by the shooting device, whether to start the shooting device to begin shooting a video, and recording face feature information corresponding to the video;

uploading, according to an uploading condition, the face feature information and the shot video corresponding to the face feature information to a server after the shooting is completed.

Optionally, the shooting device meeting a starting condition comprises:

the shooting device detects that the motion data reaches a preset positive threshold, wherein the motion data is any one or a combination of the following: acceleration, magnitude of change in height, magnitude of change in air pressure, and magnitude of change in acceleration.

Optionally, the shooting device pertains to a device group including multiple shooting units, the shooting device is one of the multiple shooting units, wherein the judging if the shooting device meets a starting condition comprises:

confirming whether number of pre-start shooting units in the device group meets a preset requirement, wherein the pre-start shooting unit is the shooting unit which detects that the first motion data reaches a first preset positive threshold; and judging if the shooting device meets the starting condition according to a confirmation result.

Optionally, the judging if the shooting device meets the starting condition according to a confirmation result comprises:

the shooting device detecting whether its own second motion data reaches a second preset positive threshold when the number of the pre-start shooting units conforms to the preset requirement; and wherein if the second motion data reaches the second preset positive threshold, it is determined that the shooting device meets the starting condition.

Optionally, the device group is provided with a main shooting unit, wherein the judging if the shooting device meets the starting condition comprises:

if the shooting device detects that its motion parameter reaches the preset positive threshold, the shooting device sends a start judgment signal to the main shooting unit;

sending a starting command to other shooting devices in the device group if number of start judgment signals received by the main shooting device is greater than a preset value; and the shooting device confirming that the shooting device meets the starting condition if the shooting device receives the starting command sent from the main shooting unit.

Optionally, the judging if the shooting device meets the starting condition comprises:

monitoring start judgment signals and starting commands sent from other shooting units in the device group, wherein any one of the shooting units in the device group sends a start judgment signal by broadcasting when it detects that its own first motion data reaches the first preset positive threshold, and any one of the shooting units in the device group sends a starting command by broadcasting when it detects that number of its received start judgment signals is greater than a preset value;

wherein if the shooting device receives the start judgment signal sent from other shooting units in the device group, it is confirmed that the shooting device meets the starting condition; or if the number of the start judgment signals received by the shooting device is greater than the preset value, it is confirmed that the shooting device meets the starting condition and the starting command is sent by broadcasting.

Optionally, after the starting the shooting device to begin shooting a video, the method further comprises:

a motion sensor of the shooting device detecting whether the shooting device meets a stopping condition; and controlling the shooting device to stop shooting the video if the shooting device meets the stopping condition.

Optionally, the at least based on a situation of face detected by the shooting device comprises any one or a combination of the following:

based on that the shooting device detects that a proportion of face area in the image area shot by the shooting device reaches a preset proportion; or based on that the shooting device detects that the number of faces in the image area shot by the shooting device reaches a preset number; or based on that the shooting device detects that pixel size of the face area reaches a preset pixel size; or based on that the shooting device detects that a position of the face area in the image area shot by the shooting device meets a preset position requirement.

Optionally, the above method further comprises:

the shooting device recognizing a subjective willingness of a person being shot after detecting a face, and determining whether to start the shooting device to begin shooting according to a recognition result;

Optionally, the recognizing a subjective willingness of a person being shot comprises:

the shooting device judging, after detecting the face image, whether an expression represented by the face image conforms to a preset positive expression so as to speculate the subjective willingness of the person being shot; or the shooting device judging, after detecting a face image and a gesture image, whether the gesture image conform to a preset gesture image representing agree to the shooting so as to speculate the subjective willingness of the person being shot; or judging whether a preset operating device for stopping the shooting is triggered so as to speculate the subjective willingness of the person being shot.

Optionally, after the recording face feature information corresponding to the video, the method further comprises:

detecting faces continuously during the video shooting, updating the face feature information corresponding to the video if face feature information conforming to an update requirement is detected.

Optionally, after the starting the shooting device and beginning detecting faces, the method further comprises:

controlling the shooting device to enter the standby state and stop detecting faces if the shooting device fails to detect a face in a preset time period.

Optionally, before the uploading the face feature information and the shot video corresponding to the face feature information to a server, the method further comprises:

generating binding relation information between the face feature information and the shot video corresponding to the face feature information.

Optionally, before the uploading the face feature information and the shot video corresponding to the face feature information to a server, the method further comprises:

judging whether the video conforms to an upload standard; and deleting the video if the video does not conform to the upload standard.

Optionally, the judging whether the video conforms to an upload standard comprises:

comparing the video with a preset standard face image, judging whether the video conforms to the upload standard; and/or judging whether the video conforms to the upload standard according to a preset standard video parameter.

Optionally, uploading the face feature information and the shot video corresponding to the face feature information to a server comprises:

uploading the face feature information to the server;

receiving feedback information sent by the server based on the face feature information; and determining whether to upload the video corresponding to the face feature information according to the feedback information.

Embodiments of the present disclosure further provide a shooting method for a shooting device, comprising:

starting a shooting device to begin shooting a video if the shooting device detects a face, and recording face feature information corresponding to the video;

uploading the face feature information and the corresponding video to a server and saving the face feature information and the corresponding video according to an upload and save condition after the shooting is completed, wherein binding relation information is generated between the face feature information and the corresponding video;

the server receiving retrieve information, retrieving and matching corresponding face feature information according to the retrieve information and generating a matching result; and the server outputting video information bound with the matched face feature information according to the matching result and the binding relation information.

Optionally, the uploading the face feature information and the corresponding video to a server and saving the face feature information and the corresponding video according to an upload and save condition comprises:

the server using newly received face feature information as first face feature information, and retrieving and matching the first face feature information with the existing face feature information in a face feature information database;

saving the first face feature information into the face feature information database if no face feature information matching the first face feature information is detected in the face feature information database, and saving the video accordingly;

if second face feature information matching the first face feature information is detected in the face feature information database, comparing the first face feature information and the second face feature information, selecting to retain the face feature information having a better quality according to a comparison result and saving the video accordingly.

Optionally, the uploading the face feature information and the corresponding video to a server and saving the face feature information and the corresponding video according to an upload and save condition comprises:

the server using newly received face feature information as first face feature information, and retrieving and matching the first face feature information with the existing face feature information in a face feature information database;

judging whether a video storage limit is triggered according to historical video data corresponding to the second face feature information after the second face feature information matching the first face feature information is detected in the face feature information database; and determining a method for processing the uploaded video according to a judgment result.

Optionally, the determining a method for processing the uploaded video according to a judgment result comprises:

deleting the uploaded video if the video storage limit is triggered, and saving the uploaded video if the video storage limit is not triggered; or limiting a storage time length of uploaded video to a first time length if the video storage limit is triggered, and setting the storage time length of the uploaded video to be a second time length if the video storage limit is not triggered, wherein the second time length is larger than the first time length; or analyzing and clipping the currently uploaded video or the historical video data if the video storage limit is triggered, such that a total length of saved videos is not greater than a third time length, and saving the uploaded video accordingly if the video storage limit is not triggered.

Optionally, the retrieving and matching corresponding face feature information according to the retrieve information and generating a matching result further comprises:

retrieving and matching the corresponding face feature information to generate a retrieve result of face feature information having matching degree index information of numerical values;

determining the matching result according to the matching degree index information.

Optionally, the determining the matching result according to the matching degree index information comprises:

determining a quality index representing a quality of face feature information in the retrieve result; and determining a matching rule according to the quality index and determining the matching result according to the determined matching rule and the matching degree index information.

Optionally, the server outputting video information bound with the matched face feature information according to the matching result and the binding relation information comprises:

outputting, if multiple videos are stored corresponding to the face feature information contained in the matching result, description information for the multiple videos;

receiving a selection instruction from the user for selecting a target video among the multiple videos based on the description information; and outputting the target video to play according to the selection instruction.

Optionally, the uploading the face feature information and the corresponding video to a server and saving the face feature information and the corresponding video according to an upload and save condition after the shooting is completed comprises:

judging whether the video conforms to an upload standard after the shooting device completes the shooting; and uploading, according to an uploading condition, the face feature information and the shot video corresponding to the face feature information to a server if the video conforms to an upload standard.

Optionally, the judging whether the video conforms to an upload standard comprises:

the shooting device comparing the video with a preset standard face image, judging whether the video conforms to the upload standard; and/or judging whether the video conforms to the upload standard according to a preset standard video parameter.

Optionally, the judging whether the video conforms to an upload standard comprises:

the shooting device sending the face feature information to the server; and receiving feedback information sent by the server based on the face feature information, and judging whether the video conforms to the upload standard according to the feedback information.

Optionally, the above method further comprises:

starting the shooting device to begin shooting a video if the shooting device detects a face, and recording face feature information corresponding to the video;

detecting faces continuously during the video shooting; and updating and recording, if new face feature information conforming to an update requirement is detected, the face feature information corresponding to the video according to the new face feature information.

Optionally, the shooting device detecting a face comprises any one or a combination of the following:

the shooting device detects that a proportion of face area in the image area shot by the shooting device reaches a preset proportion; or the shooting device detects that the number of faces in the image area shot by the shooting device reaches a preset number; or the shooting device detects that pixel size of the face area reaches a preset pixel size; or the shooting device detects that a position of the face area in the image area shot by the shooting device meets a preset position requirement.

Optionally, the new face feature information conforming to the update requirement comprises any one or a combination of the following:

a proportion of the face area in the new face feature information is higher than the proportion represented by an original face feature information; or a sharpness of the new face feature information is higher than a sharpness represented by the original face feature information; or a shooting angle of the face image in the new face feature information is better than the angle represented by the original face feature information; or a number of faces in the new face feature information is larger than a number of faces represented by the original face feature information.

Embodiments of the present disclosure further provide an electronic equipment, comprising a memory, a processor and a computer program which is stored in the memory and runnable on the processor, wherein the processor is configured to execute the computer program to realize the following steps of:

a shooting device in a standby state detecting motion data and judging if the shooting device meets a starting condition according to the motion data; starting the shooting device and beginning detecting faces if the shooting device meets the starting condition;

determining, at least based on a situation of face detected by the shooting device, whether to start the shooting device to begin shooting a video, and recording face feature information corresponding to the video;

uploading, according to an uploading condition, the face feature information and the shot video corresponding to the face feature information to a server after the shooting is completed.

FIG. 1 shows a flowchart of a shooting method 100 according to embodiments of the present disclosure, as shown in FIG. 1, the method includes steps of:

Step S101: A shooting device in a standby state detecting motion data and judging if the shooting device meets a starting condition according to the motion data;

Step S102: starting the shooting device if it is confirmed that the shooting device meets the starting condition and beginning detecting faces;

Step S103: recording, if the shooting device detects a face, face feature information and starting the shooting device and beginning shooting a video;

Step S104: uploading the face feature information and the shot video to a server according to an upload condition after the shooting is completed.

In certain scenarios, if there is no significant change in the image within the acquisition range of the shooting device, the face detection and image shooting are not required to be performed continuously, thereby reducing the power consumption, and if a significant change in the image within the acquisition range of the camera is about to be produced or has already taken place, further face detection and image shooting are required. Therefore, in the present disclosure, the motion data may be used as a basis for determining whether the image acquired by the shooting device has changed, wherein when the motion data meets the starting condition and it is considered that a significant change has taken place in the image within the acquisition range of the shooting device, the shooting device further activates functions of face recognition and image shooting.

The shooting device of the present disclosure can be mounted on various amusement park equipment such as roller coasters, carousels, drop towers, and topple towers, the device can be mounted to transportation means such as race cars and bicycles. Motion sensor, video acquisition module with face recognition function and network transmission module for communication with the server are integrated in the shooting device. Optionally, the shooting device is a motion camera.

Detailed implementation steps of the shooting method according to the embodiments of the present disclosure are to be introduced below in detailed with reference to FIG. 1.

Step S101: A shooting device in a standby state receiving motion data and judging if the shooting device meets a starting condition according to the motion data;

Specifically, when the shooting device is in the standby state, the face recognition and shooting functions of the device may all be turned off, thus the shooting device at this time has low power consumption. Optionally, it is feasible to set that the shooting device in the standby state merely runs the simplest data monitoring function of sensors, which function consumes much less power than the face recognition function, thereby the high power consumption caused by continuously running of other functions of the camera can be alleviated.

In some embodiments, the starting condition of the shooting device may be set according to the environment where the shooting device is placed, descriptions are to be made below taking the shooting device being an independent single motion camera as an example and taking the shooting device being a plurality of motion cameras forming a network.

In case of an independent single motion camera:

In a case where the application scenario is that a single motion camera is used for shooting (no matter the actual physical position of the motion camera is separately set or set in a certain array of motion cameras), it is feasible to set that when a motion sensor of the motion camera detects that the motion data has reached a preset positive threshold, it is considered that the starting condition is met.

Optionally, the motion sensor may include, but is not limited to: gravity sensor, accelerometer, speedometer, barometer, gyroscope, range sensor, GPS receiver, or the like. Corresponding, the motion data may be, but is not limited to: any one or a combination of absolute or variable values of position, velocity, air pressure, angular velocity, etc. Those skilled in the art can understand that the above list is demonstrative rather than restrictive, types of the motion sensor and the motion data which are used in the embodiment of the present disclosure are not limited to those listed above.

For instance, when the motion camera is mounted to a topple tower, the starting condition may be set as the change in air pressure exceeding 1000 Pa/s, and when the motion camera is mounted on a roller coaster, the starting condition may be set as the change in velocity reaching 3 m/s, or the acceleration reaching 0.1 g, etc.

In certain special application scenarios, due to excessively large differences among the positions of points in the array of motion cameras, or a difference between the time-speed curves of the points in the array during operation of the equipment, or an inconsistency between the change time of the speed and acceleration of the equipment during operation and the expected start time of the shooting, it is impossible to select the appropriate threshold of motion data of types such as velocity and acceleration to start the motion camera at a correct moment. This will further lead to a result that when the motion camera is set at a certain position, especially when the motion camera is in a camera array, the use of motion data on types of velocity and acceleration alone or in combination may prevent the motion camera from starting shooting correctly at the desired moment. Thus in the present embodiment, pressure values or pressure changes from the barometer or other positional motion-type data, alone or in combination with other motion data (such as motion data of velocity and acceleration types) may be selected as the motion data for detection use, which enables the motion camera to correctly set a starting threshold, improving the consistency between the starting positions and reducing the difficulty of installation and maintenance.

In case of multiple cameras forming a network:

In a case that the application scenario requires multiple cameras coordinate with each other for shooting, in order to guarantee the consistency and the coordination between the shooting time of the multiple cameras, it is also feasible to use the multiple cameras to form a network so as to realize communication, data exchange and instruction synchronization between different equipment. For example, the network may be established based on an Internet of things protocol (such as Zigbee), evidently the network may also be established based on a LAN networking technology, which is not limited herein.

Further, in view of the fact that motion cameras in the same network are usually installed on the same facility, if the facility begins to move, the multiple motion cameras will detect similar change signals on the sensors in the same or similar time period. Therefore, in order to avoid interference from a single motion camera which causes a mistake start-up, it is feasible to set: in the camera group forming the network, only after cameras whose number meeting a preset number detect that the first motion data reaches the preset positive threshold, starting of all the motion cameras in the camera group is determined. That is to say, the motion camera that detects the first motion data reaching the preset positive threshold is used as a pre-start motion camera, and when the number of the pre-start motion cameras in the camera group meets the preset requirement, it is determined that all the motion cameras in the camera group meet the starting condition.

In some other embodiments, each pre-start motion camera may decide whether to activate a pre-start state according to a part of data, i.e., the first motion data. For example, in an embodiment, the pre-start motion camera is configured to activate the pre-start state based on a magnitude of change in acceleration, after the number of pre-start cameras in the camera group meets the preset requirement, each camera in the camera group further checks its second motion data, e.g., value of pressure change, and when the second motion data also reaches a preset positive threshold, the camera confirms that the starting condition is met.

In the embodiment of the present disclosure, the preset requirement may be a requirement on proportion, for example, the number of pre-start motion cameras in the camera group accounts for 50% or more of camera group; the preset requirement may be also be a requirement on number, for example, the pre-start motion cameras in the camera group reaches 5 or more, which is not limited herein.

In specific implementation, the above-described collaborative anti-interference starting of the camera group may be realized in various modes, and two among which are taken below as examples.

The first mode is realized by providing a main motion camera.

That is to say, a main motion camera is provided in the camera group, the main motion camera may be provided at the time of networking and installing the camera array, according to need, at least one main motion camera is manually or automatically selected as the camera for information reporting and control instruction sending. According to a certain preset rule, and when a preset condition is met, the control right of the main motion camera can also be switched to another camera turn it into the main motion camera, or in case of malfunction of the main motion camera, other cameras may re-elect a new camera as the main motion camera according to an automatic strategy.

The setting, selection, switchover of the main motion camera and the corresponding rules thereof may be realized using any known method and any equivalent implementation that can achieve a similar effect in the prior art, which are not limited in the present disclosure. For example, in an embodiment, the main motion camera may be selected using the Leader Election mechanism in the Apache ZooKeeper open source software project.

If each motion camera detects that its first motion data reaches the preset positive threshold, the motion camera sends motion state data to the main motion camera, prompting that the camera has entered the pre-start state. After confirming that the number of the pre-start motion cameras meets the preset requirement based on the motion state data received from each camera, the main motion camera sends a pre-start complete command to each motion camera in the camera group. Each motion camera in the camera group determines whether the motion camera meets the starting condition based on the pre-start complete command.

Further, in order to avoid mistake start-up, it is also feasible to set that only after each motion camera detects that its first motion data reaches the preset positive threshold and it lasts for a time period, the motion camera sends motion state data to the main motion camera. In this way, the burr noise in the process of motion data acquisition is prevented from accidentally triggering the action of sending motion state data to the main motion camera.

The motion state data sent by each motion camera may be the values of specific motion parameters detected by the motion sensor (such as acceleration value, velocity value or magnitude of height change, etc.). It can also be a signal sent according to a preset code (for example, code "1", "a" or "PASS", etc.) after determining that the value of the motion parameter detected by the motion sensor has reached the preset positive threshold.

For example, after detecting that the acceleration exceeds the preset positive threshold and it lasts for a preset period of time, each motion camera sends the acceleration value and direction information to the main motion camera, and when the main motion camera detects that over a half of the acceleration values and the direction information sent from the motion cameras in the camera group are the same with the acceleration value and direction information currently sensed by the main motion camera or the errors therebetween is smaller than a preset value, it is determined that all the motion cameras meet the starting condition and a starting instruction is sent.

For another example, after detecting that the acceleration value exceeds the preset positive threshold and it lasts for a preset period of time, each motion camera send a binary signal "1" to the main motion camera, and after receiving the "1"s from over 30% of the motion cameras in the camera group, the main motion camera determines that all the motion cameras meets the starting condition and sends the starting instruction. Specifically, by adopting a manner of sending binary signals and other codes to the main motion camera, less data is to be transmitted, which can effectively save network resources.

The second mode is realized by broadcasting.

That is to say, after any motion camera in the camera group detects that its motion parameter reaches the preset positive threshold, the motion camera sends its own start judgment signal to other motion cameras in the camera group and keeps receiving the start judgment signals sent by other motion cameras. After any motion camera in the camera group confirms that the number of the pre-start cameras in the camera group meets the preset requirement according to the received start judgment signal, the motion camera confirms that it meets the starting condition and sends the starting command to the whole group by broadcasting, if another motion camera receives the starting command, it also confirms that the starting condition is met.

In the above, the form of the starting judgment signal may be the same as that in the foregoing solution realized by providing the main motion camera, which will not be repeatedly described herein.

For example, after detecting that the acceleration value exceeds the preset positive threshold and it lasts for a preset period of time, the motion camera send a binary signal "1" to the entire group by synchronous signal broadcasting, and after one certain motion camera receives the "1"s from over 40% of the motion cameras in the camera group, the main motion camera determines that the motion camera itself meets the starting condition and sends the starting instruction to other motion cameras by broadcasting.

Evidently, in specific implementation, besides the two above-described implementation of collaborative anti-interference starting of the camera group, it is also feasible to provide a server for controlling and managing the camera group. If each motion camera detects that its motion parameter reaches the preset positive threshold, the motion camera sends start judgment signal to the server. After confirming that the number of the pre-start motion cameras meets the preset requirement based on the number of the received start judgment signals, the server sends a starting command to each motion camera in the camera group.

Correspondingly, based on the same conception, after the motion camera is started, it is also feasible to detect whether the motion camera meets a stopping condition using the motion sensor of the motion camera, wherein if the motion camera meets the stopping condition, the motion camera is controlled to stop shooting video.

Further, in order to avoid a mistake stop, in the camera group forming the network, only after cameras whose number meeting a preset number detect that the motion parameters reach a preset backward threshold, it is confirmed that the camera group meets the stopping condition, then stop of all the motion cameras in the camera group is determined. That is to say, the motion camera that detects the motion parameter reaching the preset backward threshold is used as a pre-stop motion camera, and when the number of the pre-stop motion cameras in the camera group meets the preset requirement, it is determined that all the motion cameras in the camera group meet the stopping condition, then a stopping action will be executed. Considering that the detailed manner of stop judgment is similar to the foregoing manner of start judgment, for sake of brevity of the description, it will not be repeatedly described herein.

Step S102: executing starting of the shooting device and beginning detecting faces if it is determined that the shooting device meets the starting condition.

Specifically, after the shooting device meets the starting condition, not all the functions thereof are activated, and the shooting device does not really shoot a video, it only actives the function of face detection and starts to capture and detect faces. The face detection here is merely for determining, by searching, whether a face is included in the images captured by the shooting, for this reason, feature calculation and comparison with a preset face image are required to be performed, and nor is it required to analyze the detailed appearance feature of the face. Only existence of the face, number of existing faces or positions of the faces are required to be detected, for this reason, calculation amount under such starting state is relatively small, which will not excessively occupy calculation resources, thereby the power consumption is also relatively lower.

Step S103: determining, based on a situation of face within a detected shooting range, whether to start the shooting device to begin shooting a video, and recording feature information that can be used for face recognition.

In specific implementation process, it is feasible to determine judgment criteria of the shooting device successfully detecting a face, several criteria are listed below with the shooting device being a motion camera taken as an example.

The first criterion is that the motion camera may begin shooting a video when detecting that a face area accounts for a preset proportion in the entire image area captured by the camera. In the above, the preset proportion may be set according to the scenario or position where the motion camera is installed, for example, when the position where the camera is installed is relatively distant from a seat on the facility, the preset proportion may be set to be a smaller value, and when the position wherein the camera is installed is relatively close to the seat on the facility, the preset proportion may be set to be larger.

For example, in some scenarios, when the image area accounts for an excessively small proportion in the entire image area captured by the camera, it is impossible to obtain a clear face image, accordingly, the face recognition cannot be performed precisely. Therefore, in the present embodiment, after being started, the motion camera begins detecting faces, if a face is detected, then a successful detection of face may be confirmed if the face region accounts for 5% or more in the image currently captured by the motion camera. The specific face recognition may be any existing face detection algorithm, which is not limited herein.

The second criterion is that in some scenarios, the motion camera may begin shooting a video when detecting that the number of faces in the image area captured by the motion camera reaches a preset number. In the above, the preset number may be set according to the scenario or position where the motion camera is installed.

For example, when the motion camera is installed on a two-person amusement equipment and the face detection is started, if a face is detected and the number of faces in the image currently captured by the motion camera reaches 2, then a successful detection of face is confirmed. In order to avoid interference from background faces, it is also feasible to set that a successful detection of face is confirmed when the number of faces which each accounts for 6% or more of the image reaches 2.

The third criterion is that pixel size of the face area detected by the motion camera reaches a preset pixel size. The preset pixel size may be set according to the scenario or position where the motion camera is installed.

For example, after the motion camera is started and begins detecting faces, a successful detection of face may be confirmed if it is detected that the pixel size of the face region reaches 80*80 in the image currently captured by the motion camera.

The forth criterion is that the motion camera detects that a position of the face area in the image area captured by the camera meets a preset position requirement.

For example, a position of a central area may be preset, after being started, if the motion camera detects that the face region is located in the preset central image area in the image currently captured by the motion, then a successful detection of face can be confirmed.

In specific implementation process, the judgment criteria of the shooting device successfully detecting a face are not limited to the four criteria listed above, and may be set as needed.

In some implementations, after existence of face is detected, it is also feasible to further speculate a subjective willingness of the person being shot, and to decide whether to begin shooting according to a speculation result.

Speculation of a subjective willingness of the person being shot may be realized by recognition of image features.

For example, taking the shooting device being a motion camera as an example, in an embodiment, after detecting a face image, the motion camera further recognizes and judges whether the facial expression represented by the face image conforms to a preset positive expression. The expressions that can be set may specifically be: smile, laughter and seriousness and other expressions. It is also feasible to adopt an exclusion mode and set the positive expressions to be: any other expressions other than expressions of cry, sadness, depression and anger. The specific method for expression recognition may be any existing expression recognition algorithm, which is not limited herein.

For example, if the motion camera detects a face and recognizes the expression of the face as laughter by analyzing, the motion camera determines the expression as a positive expression and confirms to start the shooting. For another example, if the motion camera detects a face and recognizes the expression of the face as cry by analyzing, the motion camera determines that the expression is not a positive expression and gives up starting the shooting.

In another embodiment, the motion camera recognizes the face image and a preset gesture image representing agree to the shooting, the gesture images may be specifically set to be: "OK" gesture, "V" gesture, and raised hand gesture, it is also feasible to adopt an exclusion mode and set the gesture expressions to be gestures other than waving, covering face, and wagging finger, which are not limited herein.

For example, after the motion camera is started, if a face recognition module detects a face and recognizes a gesture image of raised hand, the motion camera confirms to start shooting. For another example, if the face recognition module detects a face and recognizes a gesture image of wagging finger, the motion camera considers that the user is unwilling to the shoot and thus gives up starting the shooting.

The image content can be recognized by any common means in the prior art, such as image recognition by the conventional pattern recognition method or by deep learning based on Convolutional Neural Networks (CNN), which will not be repeatedly described herein, In some other embodiments, speculation and judgment of a subjective willingness of the person being shot may be realized in an interactive mode, for sample, in another embodiment, a button is provided for enabling a connection to the shooting device. By detecting whether the button is pressed by the person being shot, the subjective willingness of the person being shot can be speculated, specifically, when the person being shot is unwilling to the shooting, he/she can stop the shooting device from starting the shooting by pressing the button. The specific forms of the interactive mode are not limited herein.

Speculation and judgment of the subjective willingness of the person being shot before the shooting can not only reduces the power consumption of the shooting system, reduce the invalid working time of the shooting device, extend the service life of the system, but also can effectively lower the amount of network traffic after the completion of the shooting and improves the overall performance of the network. Those of ordinary skills in the art should understand that the judgment criteria of the subjective willingness of the person being shot are not limited to the above embodiments, any technical means which can achieve the speculation of the subjective willingness of the person being shot and by which whether to start the shooting by the shooting device can be decided, are capable of realizing the above technical effects.

Meanwhile, those of ordinary skills in the art can understand that the above judgment criteria for determining whether to start the shooting device to begin shooting a video can not only be used alone, but also be used in combination. For example, the first, fourth and fifth judgment criteria above described can be combined, hereby it is set that the video shooting is started only when the proportion of the face area in the image area captured by the camera reaches a preset proportion, and the face area is located in the central area, and the expression conforms to the preset positive expression.

Further, it is also feasible to set that if the shooting device fails to detect a face in a preset time period, the shooting device is controlled to enter the standby state and stop face detection. That is to say, if the shooting has lasted for a certain time period and fails to detect a face meeting the requirements from the images, the motion camera switches to the standby state and no longer detects faces so as to reduce the power consumption.

In some embodiments of the present disclosure, in view of the fact that the shot video can be used for user's search in the later stage, it is also feasible to set that after the shooting device detects a face, the feature information corresponding to the face is extracted for facilitating the user to find the video according to the feature information on the face.

The feature information may be an acquired face image, or may be data representing face details (e.g., face type, brow size and shape, eye shape, lip shape, and hair type, etc.), or may be three-dimensional reconstruction data of the face acquired by provided on the shooting device or by additional three-dimensional reconstruction devices separated from the shooting device, such as the currently common structured light device, binocular stereo vision device or Time of flight (ToF) device. Detailed description is made below with the feature information being an acquired face image taking as an example.

Further, in view of the fact that the face scene detected before video shooting does not necessarily include the optimal face feature information, therefore in the present embodiment it is also set that, during the video shooting, the shooting device continuously detects faces, wherein if face feature information conforming to the update requirement is detected, then feature information corresponding to the video currently being shot is updated according to the face feature information, such that the feature information corresponding to the video is optimal after the video shooting is finished, which is most conducive to the video searching based on face feature information matching.

It is to be noted that since the position of the shooting device is usually fixed and the possibility of the shot object being changed during motion state of the facility is relatively small, it is only necessary to judge a quality of the face detection information in the face detection during the video shooting, and it is unnecessary to perform calculation or comparison with a preset face image, that is to say, it is unnecessary to analyze the detailed appearance features of the face, while in the image captured by the camera, only existence of a face, number of existing faces, proportion of face region, the position of the face, and/or sharpness (or definition) of the face are detected, therefore such face detection involves a smaller calculation amount and does not occupy excessive calculation resources and has a relatively low power consumption.

Specifically, the methods for determining whether the detected face image conforms to an update requirement may be set as needed, and several of which are listed below as examples:

The first method is that the proportion of the face area in the newly detected face image is higher than the proportion represented by the previously bound feature information.

If the previously bound feature information is an image, the proportions of the face areas in the two images are directly compared, and if the previously bound feature information is data representing face details, the face size, i.e., corresponding proportions is restored so that to be compared with that of the newly detected image.

The second method is that the sharpness of the newly detected face image is higher than the sharpness represented by the feature information.

If the previously bound feature information is an image, the sharpnesses of the two images are directly compared, and if the previously bound feature information is data representing face details, comparison with the newly detected image is performed according to the sharpness represented by the data.

The third method is that the shooting angle of the newly detected face image is better than the angle represented by the feature information.

If the previously bound feature information is an image, the shooting angles of the two images are directly compared and the image with the face angle more facing towards the front may be selected as the updated image, and if the previously bound feature information is data representing face details, the shooting angle of the face may be restored according to the data and then compared with that of the newly detected image.

The fourth method is that the number of faces in the newly detected face image is larger than the number of faces represented by the feature information.

Evidently, the methods for judging whether the face image meets the update requirement can not only be used alone, but also in combination. For example, the above first and second determination criteria may be combined: it is set that the newly detected face image is confirmed as conform to the update requirement only when the proportion as well as the sharpness of the face area in the newly detected face image is higher than those represented by the previously bound feature information.

In specific implementation process, the methods for judging whether the face image meets the update requirement are not limited to the above four methods and can be set as needed.

Similarly, when the face feature information is three-dimensional reconstruction data, it is also feasible to continuously iteratively update face feature information data based on the corresponding data quality index during the video shooting, wherein the specific data quality index may be selected as needed, which will not be repeatedly described herein.

By continuously detecting and updating the feature information corresponding to the video during the video shooting, the shot video can be bound with a face image or data having a relatively optimal effect, which improves the matching efficiency and matching accuracy of the face searching in the later stage.

Since the shot videos may take up a lot of internal storage space of the camera, in addition, upload of videos may consume a lot of traffic, in some embodiments, it is feasible to recognize the content of the video during the shooting and to decide whether to save and upload the video according to a recognition result of the content of the video, thereby reducing the system overheads of shooting, storage and traffic.

For example, in some embodiments, it is also feasible to recognize facial expressions during the shooting. If the recognized expression is a negative expression such as anger, sadness or depression, then the shooting in progress is stopped, or the video is directly discard and is not to be uploaded to the server after completion of the shooting. If the expression is a positive expression such as happiness, excitement, then the shooting in progress continues.

In some other embodiments, it is also feasible to recognize a gesture during the shooting and to decide whether to continue the shooting according to the gesture. For example, when the information obtained from detecting the user's gesture is a waiving gesture showing that the user is unwilling to the shooting, then the shooting in progress is stopped or the video is directly discarded after completion of the shooting.

The video content can be recognized by any common means in the prior art, such as image recognition by the conventional pattern recognition method or by using deep learning based on Convolutional Neural Networks (CNN), which will not be repeatedly described herein, Step S104: uploading the recognized face feature information and the shot video corresponding to the face feature information to a server according to the upload condition after the shooting is completed.

In some embodiment, the uploading condition is uploading all the recognized face feature information and all the shot videos to the server.

In some other embodiments, before uploading the shot video and the corresponding face feature information to the server, the quality of the shot video is determined, as an uploading condition, i.e., determining whether the video conforms to an upload standard(s), wherein if the video does not conform to the upload standard, the video is deleted, and only videos conforming to the upload standard are to be uploaded so as to reduces pressures on server storage and network transmission.

The specific upload standard may be set in the two aspects below:

In the first aspect, the video is compared with a preset standard face image so as to judge if the video conforms to the upload standard.

The standard face image can be a clear image that is captured by the shooting device before the video shooting or during the video shooting and contains the same face as that in the video, and the standard face image captured is caught and captured by the shooting device, rather than an image taken from the video. The standard face image may also be a clear image received from the cloud by the shooting device or sent by other equipment, which contains the same face as that in the video. The resolution of the standard face image can be higher than or equal to the resolution of the video.

For example, after the shooting is finished, the shooting device may match the standard face image with the face image having the optimal effect which is detected by the shooting device, wherein if the face image having the optimal effect which is detected by the shooting device has an effect (such as sharpness, face angle or face size) worse than that of the standard face image, then the video is considered to be unqualified and directly discarded.

For another example, after the shooting is finished, the shooting device may match the standard face image with multiple face images randomly extracted from the video, wherein among the frames of the multiple extracted face images, if the proportion of the image frames having a worse effect than that of the standard face image is higher than a preset proportion, then the video is considered to be unqualified and directly discarded.

In the second aspect, it is judged if the video conforms to the upload standard according to a preset standard video parameter.

The standard video parameters can be one or a combination of parameters such as length of clear recording, the brightness and shade of recording light, the uniformity of recording light, and the video code rate.

For example, after the shooting is completed, the shooting device can detect the length of the clear segments in the entire video, the average brightness of the recording and other parameters. If these parameters do not meet the standard video parameters, the video is considered unqualified and discarded directly.

Evidently, in specific implementation process, the upload standards are not limited to the above two and may be set according to experience and needs, which are not limited herein.

In some embodiments, the face feature information, the corresponding shot video and the bound information may be uploaded simultaneously, and may be uploaded based on a rule of sequential order. For example, in an embodiment, the face feature information may be first uploaded, then it is decided whether to upload the corresponding shot video and the bound information according to feedback information from the server. Methods for judging upload conditions with a server are described in detail below.

In the embodiments of the present disclosure, the shooting method further includes step S105, i.e., binding the recognized face feature information with the corresponding video and generating binding relation information. The term "binding" herein and in the present disclosure means a establishing and saving a corresponding relation between the face feature information and the corresponding video, and "binding relation information" is information containing the above corresponding relation. In an embodiment, the binding is done by merging the face feature information and the video into one file or by putting the both into one folder, wherein the binding relation information may be the name of the file or folder. In another embodiment, the binding is done by writing the face feature information and an identification code corresponding to the video into a mapping file (e.g., a text file), wherein the mapping file may be binding relation information. In still another embodiment, the binding is done by writing an identification code of the face feature information into the video, or by writing the identification code of the video into the face feature information, wherein the written codes may be the binding relation information. In some embodiments, the binding is done before the shooting device uploads the video and the face feature information to the server. In some other embodiments, a local or remote server may also participate in the binding between the face feature information and the corresponding video. The wording "participate in the binding" here and in the present disclosure means the binding between the face feature information and the corresponding video is done by the local or remote server, alone or in combination with other devices (such as the shooting device). A process of the local or remote server participating in the binding between the face feature information and the corresponding video will be described in detail below.

Figure 2:
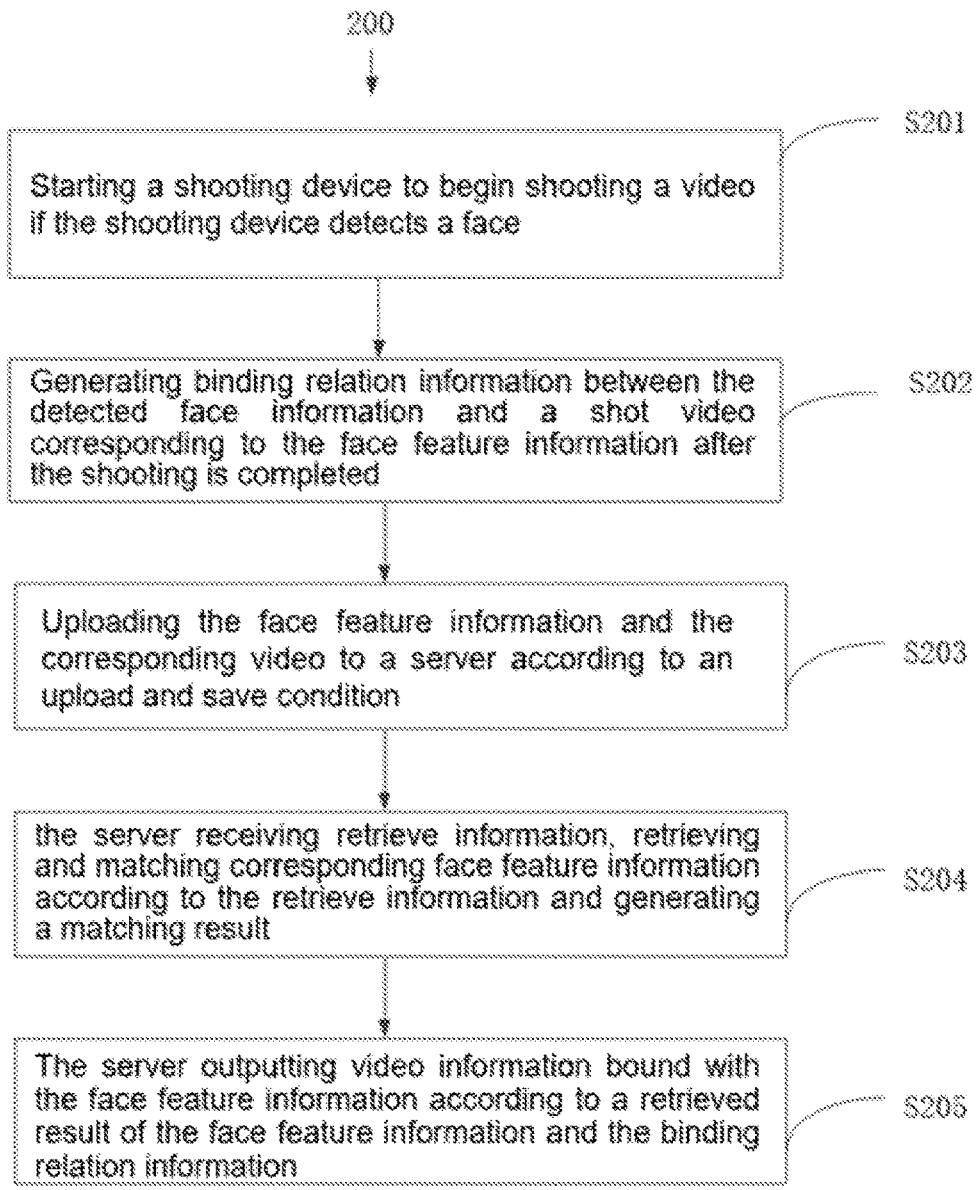
FIG. 2 is a flowchart of a video shooting and playing method at the system side according to embodiments of the present disclosure.

In some other embodiments, as shown in FIG. 2, the present disclosure further provides a shooting method 200 for a shooting device, Step S201: starting a shooting device and beginning shooting a video if the shooting device detects a face;

Step S202: generating binding relation information between the detected face information and a shot video corresponding to the face feature information after the shooting is completed;

Step S203: uploading the face feature information and the corresponding video to a server according to an upload and save condition;

Step S204: the server receiving retrieve information, retrieving and matching corresponding face feature information according to the retrieve information and generating a matching result;

Step S205: the server outputting video information bound with the face feature information according to a retrieved result of the face feature information and the binding relation information.

Figure 3:
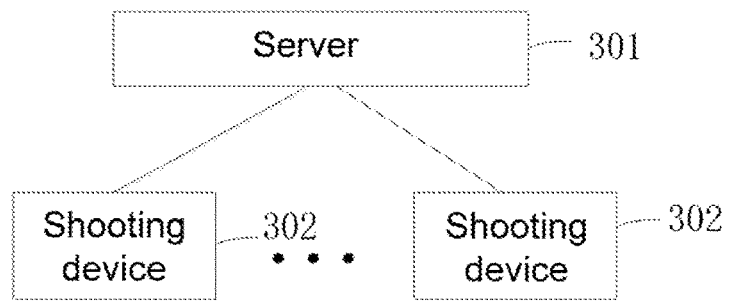
FIG. 3 is a schematic diagram of a system according to embodiments of the present disclosure.

Before introduction of the method provided in the present disclosure, a system to which the method is applicable is to be first introduced, as shown in FIG. 3, the system includes a server 301 and one or more shooting devices 302, wherein the server 301 may be a single server (a main shooting device or an independent server), a group of multiple servers or a cloud, which are not limited herein. The one or more shooting devices 302 and the server 301 may be in a wired or wireless network connection with each other, which is not limited herein.

In the method provided in the present embodiment, the step S201 has already been described in detail above, and will not be repeatedly described herein.

Step S202: generating binding relation information between the detected face feature information and a shot video corresponding to the face feature information after the shooting is completed;

Specifically, a face feature information database may be included in the server, wherein the face feature information database is configured to store face feature information (such as face image and/or face feature data). A mapping relation between each piece of face feature data and its corresponding face video is determined based on the respective binding relation information, which facilitates a video searching based on the face image in the later stage. In specific implementation process, the body of the binding relation information can be generated based on the specific form of the binding relation information, and the face feature information, the shot video and the binding relation therebetween are stored in the same server or respectively stored in different servers. For example, when the binding relation information is a separate text file and the text file is generated by the shooting device, the face feature information and the binding relation information (the mapping relation between the original face feature information and the video) are stored in a primary cloud server, and the video captured is stored in a secondary cloud server, and vice versa.

In some embodiments, the generation of the binding relation information is realized merely by using the shooting device, and in some other embodiments, the server may also participate in the generation of the binding relation information. The specific forms of the binding relation information have already been described above and will not be repeatedly described herein.

Further, in some embodiments in which the server participates in the generation of the binding relation information, after the shooting device uploads the face feature information to the server, the server uses the newly received face feature information as the first face feature information, and then performs retrieve (or searching) and matching with the existing face feature information in the face feature information database, wherein if no original face feature information matching the recognition feature information is detected, the recognition feature information of the face may be stored in a face database as an additional item in the database, and the video and the recognition feature information of the bound face may be mapped and stored accordingly and the binding relation information may be generated. Evidently, it is also feasible to select to discard the video, which is not limited herein.

If it is retrieved that the newly received face feature information matches an existing face feature information in the face feature information database (that is, the coincidence point to the same face feature), the server uses the retrieved and matched face feature information as the second face feature information, and updates the face feature information and binding relation information according to the first face feature information and the second face feature information. Specifically, it is feasible to select to retain the newly received first face feature information in the face feature information database, and to delete the second face feature information and update the binding relation information. The video previously bound with the second face feature information may be updated to be bound with the first face feature information. Conversely, similar steps may be used to retain the second face feature information, delete the first face feature information and update the binding relation information as well. Further, in order to improve the quality of the original face feature information stored in the face database of the server, so as to improve the accuracy of the video searching in the later stage, it is feasible to set that after the server finds the second face feature information in the pre-stored face database, it compares the first face feature information with the second face feature information, and selects to retain the face feature information having a better quality according to the comparison result. The specific form of the comparison may be comparing the image sharpness represented by the face feature information with that represented by the original feature information, or comparing the face size represented by the face feature information with that represented by original feature information, or comparing the face angle represented by the face feature information with that represented by original feature information, etc., which may be set as needed and is not limited herein.

Step S203: uploading the face feature information and the corresponding video to a server according to an upload and save condition;

The upload and save condition may be uploading and saving all face feature information and corresponding videos, or it may be selectively uploading and saving face feature information and corresponding videos according to a preset rule.

In specific implementation process, in order to reduce pressure on server storage and the calculation amount in the subsequent searching, a video storage limit may be first set as the upload and save condition. In some embodiments, before saving and uploading the video, the server first judges whether to trigger the video storage limit and decide a storage mode of the uploaded video according to the judgment result. For example, in an embodiment, the server first finds the matched face in the pre-stored face database, and acquires the historical video data which is corresponding to the face feature information and stored on the server. Based on the historical video data, the server determines whether to trigger the video storage limit. If the video storage limit is triggered, the uploaded video is deleted, and if the video storage limit is not triggered, the uploaded video is saved.

Further, the shooting device can first send the face feature information to the server to judge whether to trigger the video storage limit or not, wherein if it does not meet the requirement, the server will directly notify the shooting device to discard the video bound with the face feature information, which saves both storage space and network resources. The shooting device may also send the video and the bound face feature information together to the server to judge whether the video conforms to the video storage limit, wherein if it does not conform to the video storage limit, the server may directly discard the video so as to save storage space.

In some embodiments, the video storage limit may be a limit on the amount of historical video data, a limit on the total size of historical video data, or a limit on how long historical video data has been stored on the server. For example, when the server detects the face feature information bound with a video to be uploaded, and that a number of corresponding videos are already stored in the server, the server may notify the shooting devices to directly discard the face corresponding to the video to be uploaded, or although the video is uploaded to the server, the server may set a short storage time and then delete the video.

Evidently, in specific implementation process, it is not limited to the above video storage scheme. It is also feasible to set that if the historical video data triggers the video storage limit, the storage time length of uploaded video can be limited to a first time length, and if the historical video data does not trigger the video storage limit, then the video is saved accordingly or the storage time length of the video is set to be a second time length, wherein the second time length is larger than the first time length. In some other embodiments, if a sum of the total video length of the historical video data and the current uploaded video length is greater than a preset value, the current uploaded video may be analyzed and clipped, or the historical videos may be analyzed and clipped so that the sum of the saved video length is no greater than the preset value. For example, when the sum of the video length is detected to be greater than the preset value, the server detects and evaluates the contents of the uploaded video and the saved historical video data, and deletes the video frames or video clips that do not meet a preset standard, such that the total video length after saving is less than or equal to the preset value. In an embodiment, detection and evaluation on the contents of the video are on the basis of a ratio of frames including the target face in the video to the total number of frames in the video, when the ratio of frames including the target face in the video clip to the total number of frames in the video is less than a video quality threshold (for example, 50%), it is considered that the video clip fails to meet the preset standard, and then it is subjected to a deletion processing, otherwise, the video clip is retained. In another embodiment, deep learning method based on neural network can be used to classify and determine the level of excellence of video clips to determine the deletion and retention of video clips. Common methods in the prior art may be used for classifying and evaluating video contents with deep learning based on neural network, which will not be repeatedly described herein.

Step S204: the server receiving retrieve information, retrieving and matching corresponding face feature information according to the retrieve information and generating a matching result;

In the present embodiment, the server can receive retrieve information from the user side or a third-party platform so as to perform video searching. The retrieve information may include retrieve information on face feature (e.g., face image or face description data) and/or information defining a retrieve scope (e.g., gender, age group or height, etc.) The retrieve information on face feature may be an image including the face to be searched, with image being shot by the user using any image acquisition equipment (such as mobile phone terminal, tablet computer terminal, camera, etc.), it may also an image already saved by the user (such as an image locally saved or saved on a cloud storage platform by the user), with the image the containing the face to be searched. The retrieve information on face feature may also be a depth map containing face information or an image having depth information. The manner in which the user sends the retrieve information to the server may be the user scanning a QR code to enter a command panel and then sending the retrieve information to the server, it may also be the user logging in an application to send the retrieve information. In order to improve security, it is also feasible to set that before the server outputs a target video to the server or before the server receives the retrieve information, a user authentication is performed first so as to ensure that the user is not an illegal disruptor user. However, in the present embodiment, the contents of the retrieve information which serve as the basis of the searching and the acquisition and sending modes thereof are not limited to those listed above.

After receiving the retrieve information, the server finds a target face matching the retrieve information in its own face feature information database using an existing face matching algorithm. Further, in some embodiments, after receiving the retrieve information, the server first judges whether the retrieve information meets a preset requirement. For example, the server may perform quality judgment on whether the retrieve information contains face information that can be retrieved, and the judgment criteria for the retrieve information may include but not limited to the size, definition, relative position of the face information (such as the front or side face), existence of blocking (or covering) by hair styles or accessories, etc. The specific judgment process may be achieved by selecting common image algorithms regarding specific standards, such as pattern recognition algorithms or image definition detection algorithms, which will not be repeatedly described herein. When the retrieve information does not meet the preset requirement, the server sends information to the user side prompting unqualification of the retrieve information.

Since there may be multiple pieces of face feature information having close matching degrees or high matching degrees in the retrieval information, in some embodiments, when detecting and retrieving the corresponding face feature information, the server further determines the matching results to be output (i.e. the matched face feature information) according to the retrieve results and a matching rule. For example, after the retrieve, the retrieve results may be matching degree index information having numerical values, the matching rule may be analyzing the retrieve results, selecting a retrieve result whose matching degree index is greater than a matching threshold as the matching result, the matching rule may also be selecting a retrieve result having a highest matching degree as the matching result, or, selecting all retrieve results having a difference of matching degree index being within a preset difference range as compared with the retrieve result having the highest matching degree, as the matching results. The matching degree index may be obtained by using existing technology in the prior art for generating matching score values of a face image, which will not be repeatedly described herein. In some other embodiments, the matching rule itself may be determined based on features of the retrieve results. For example, the server may judge the quality of the face feature information returned from the retrieve results and give a quality index. The methods for judging the quality of facial feature information can refer to the above described methods for judging quality of retrieve information. When the quality index of the face feature information is relatively low (lower than a preset value, for example), the matching rule may be set as, selecting all retrieve results having a difference of matching degree index being within a preset difference range as compared with the retrieve result having the highest matching degree, as the matching results. When the quality index of the face feature information is relatively high, the matching rule may be set as, selecting a retrieval result whose matching index is greater than a matching threshold as the matching result.

Those of ordinary skills in the art can understand that the above rules are merely illustrative rather than definitive, and the specific matching rules may be selected according to actual circumstances, which will not be limited in the present disclosure. Determining the output matching results according to the matching rules can improve the accuracy and quantitative rationality of the matching results which are finally output, optimize the user experience, and avoid the server to output more low-quality and meaningless results, which thus reduces the system performance Step S205: the server outputting, according to the matching result and the binding relation information, video information bound with the face feature information contained in the output matching result.

Specifically, after obtaining the matching result, the server searches for the target video corresponding to the matching result according to the face feature information contained in the matching result, and the server storage face feature binding relationship with video information, uses the target video as the video information bound with the face feature information contained in the matching result, and pushes the same to the user.

Optionally, if multiple videos are stored corresponding to the target face feature information contained in the matching result, that is, when there is a binding relation between multiple videos and the target face, the description information for the multiple videos is output to the user, such that the user can select the target video to be played according to the description information. Further, the server may output the target video to play after receiving the user's selection instruction for selecting the target video among the multiple videos. In the above, the description information may include any one or a combination of the following: shooting time, time length of video playing, thumbnail and video quality score, etc. The description information may be output in the form of list output or pagination output, etc.

It is to be noted that in steps S204 and S205, when the server is a server group, steps such as receiving the retrieve information, matching and finding the target face feature information, outputting the target video, saving the video and the face database may be distributed on different servers or clouds to be executed. Evidently, the steps may also be executed on the same server or cloud, or be set as needed, which is not limited herein.

Figure 4:
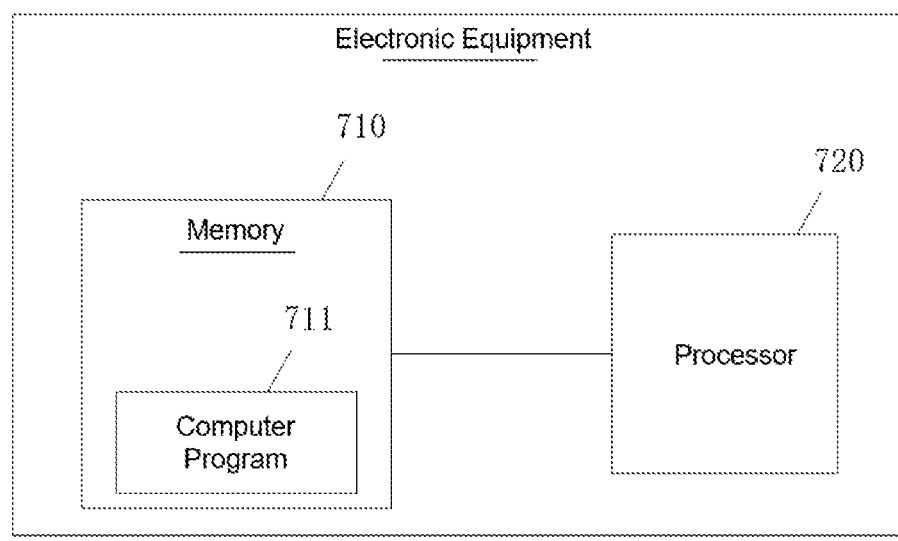
FIG. 4 is a schematic structural diagram of an electronic equipment according to an embodiment of the present disclosure.

Some other embodiments further provide an electronic equipment, as shown in FIG. 4, the electronic equipment includes a memory 710, a processor 720 and a computer program 711 which is stored in the memory 710 and runnable on the processor 720, and the processor 720 is configured to execute the computer program 711 to realize the following steps of:

a shooting device in a standby state detecting motion data and judging if the shooting device meets a starting condition according to the motion data; starting the shooting device and beginning detecting faces if the shooting device meets the starting condition;

determining, at least based on a situation of face detected by the shooting device, whether to start the shooting device to begin shooting a video, and recording face feature information corresponding to the video;

uploading, according to an uploading condition, the face feature information and the shot video corresponding to the face feature information to a server after the shooting is completed.

In the shooting method for shooting device and the electronic equipment provided in embodiments of the present disclosure, it is set that the face recognition function is activated only after detecting that the starting condition is met, which avoids the high power consumption resulted from the continuous running of the face recognition function. It is also that the shooting device is started to shoot a video after a face is detected, which reduces the high power consumption resulted from the continuous video shooting, and also avoids the traffic consumption and storage consumption caused by a large number of invalid videos being sent to the server, thereby achieving the technical effects of reducing power consumption, traffic consumption and storage space consumption.

Those skilled in the art should understand that embodiments of the present disclosure may be provided as methods, systems or computer products. Therefore, the present disclosure may be implemented in form of full hardware embodiments, full software embodiments, or software and hardware combined embodiments. In addition, the present disclosure may be in form of one or more computer program products which are implemented in computer available storage media (which include but are not limited to disk memory, CD-ROM, optical memory, etc.) containing computer available codes.

These computer program instructions may also be loaded into computers or other programmable data processing devices, such that a sequence of operational steps are performed on computers or other programmable devices to produce a computer-implemented process, in this way, instructions executed on computers or other programmable devices provide steps for implementing the functions specified in one or more processes of a flowchart and/or in one or more boxes of a block diagram.

It is apparent that those skilled in the art can make various modifications or variations on the present disclosure without departing from the essence and scope of the present disclosure. In this way, if these modifications and variations of the present disclosure fall within the scope of the claims of the present disclosure or equivalent technologies thereof, these modifications and variations are also intended to be covered by the present disclosure.

INDUSTRIAL APPLICABILITY

In the shooting method for shooting device and the electronic equipment provided in embodiments of the present disclosure, it is set that the face recognition function is activated only after detecting that the starting condition is met, which avoids the high power consumption resulted from the continuous running of the face recognition function. It is also that the shooting device is started to shoot a video after a face is detected, which reduces the high power consumption resulted from the continuous video shooting, and also avoids the traffic consumption and storage consumption caused by a large number of invalid videos being sent to the server, thereby achieving the technical effects of reducing power consumption, traffic consumption and storage space consumption.

What is claimed is:

1. A shooting method for a shooting device, comprising:
a shooting device in a standby state detecting motion data and judging if the shooting device meets a starting condition according to the motion data; starting the shooting device and beginning detecting faces if the shooting device meets the starting condition;
determining, at least based on a situation of face detected by the shooting device, whether to start the shooting device to begin shooting a video, and recording face feature information corresponding to the video;
uploading, according to an uploading condition, the face feature information and the shot video corresponding to the face feature information to a server after the shooting is completed,
wherein the shooting device pertains to a device group including multiple shooting units, the shooting device is one of the multiple shooting units, wherein the judging if the shooting device meets a starting condition comprises:
confirming whether number of pre-start shooting units in the device group meets a preset requirement, wherein the pre-start shooting unit is the shooting unit which detects that the first motion data reaches a first preset positive threshold; and
judging if the shooting device meets the starting condition according to a confirmation result.

2. The method according to claim 1, wherein the shooting device meeting a starting condition comprises:
the shooting device detects that the motion data reaches a preset positive threshold, wherein the motion data is any one or a combination of the following: acceleration, magnitude of change in height, magnitude of change in air pressure, and magnitude of change in acceleration.

3. The method according to claim 1, wherein the judging if the shooting device meets the starting condition according to a confirmation result comprises:
the shooting device detecting whether its own second motion data reaches a second preset positive threshold when the number of the pre-start shooting units conforms to the preset requirement; and
wherein if the second motion data reaches the second preset positive threshold, it is determined that the shooting device meets the starting condition.

4. The method according to claim 1, wherein after the starting the shooting device to begin shooting a video, the method further comprises:
a motion sensor of the shooting device detecting whether the shooting device meets a stopping condition; and
controlling the shooting device to stop shooting the video if the shooting device meets the stopping condition.

5. The method according to claim 1, wherein the at least based on a situation of face detected by the shooting device comprises any one or a combination of the following:
based on that the shooting device detects that a proportion of face area in the image area shot by the shooting device reaches a preset proportion; or
based on that the shooting device detects that the number of faces in the image area shot by the shooting device reaches a preset number; or
based on that the shooting device detects that pixel size of the face area reaches a preset pixel size; or
based on that the shooting device detects that a position of the face area in the image area shot by the shooting device meets a preset position requirement.

6. The method according to claim 1, further comprising:
the shooting device recognizing a subjective willingness of a person being shot after detecting a face, and determining whether to start the shooting device to begin shooting according to a recognition result.

7. The method according to claim 1, wherein after the recording face feature information corresponding to the video, the method further comprises:
detecting faces continuously during the video shooting, updating the face feature information corresponding to the video if face feature information conforming to an update requirement is detected.

8. The method according to claim 1, wherein after the starting the shooting device and beginning detecting faces, the method further comprises:
controlling the shooting device to enter the standby state and stop detecting faces if the shooting device fails to detect a face in a preset time period.

9. The method according to claim 1, wherein before the uploading the face feature information and the shot video corresponding to the face feature information to a server, the method further comprises:
generating binding relation information between the face feature information and the shot video corresponding to the face feature information.

10. The method according to claim 1, wherein before the uploading the face feature information and the shot video corresponding to the face feature information to a server, the method further comprises:
judging whether the video conforms to an upload standard; and
deleting the video if the video does not conform to the upload standard.

11. The method according to claim 1, uploading the face feature information and the shot video corresponding to the face feature information to a server comprises:

uploading the face feature information to the server;
receiving feedback information sent by the server based on the face feature information; and
determining whether to upload the video corresponding to the face feature information according to the feedback information.

12. An electronic equipment, comprising a memory, a processor and a computer program which is stored in the memory and runnable on the processor, wherein the processor is configured to execute the computer program to realize the following steps of:
a shooting device in a standby state detecting motion data and judging if the shooting device meets a starting condition according to the motion data; starting the shooting device and beginning detecting faces if the shooting device meets the starting condition;
determining, at least based on a situation of face detected by the shooting device, whether to start the shooting device to begin shooting a video, and recording face feature information corresponding to the video;
uploading, according to an uploading condition, the face feature information and the shot video corresponding to the face feature information to a server after the shooting is completed,
wherein the shooting device pertains to a device group including multiple shooting units, the shooting device is one of the multiple shooting units, wherein the judging if the shooting device meets a starting condition comprises:
confirming whether number of pre-start shooting units in the device group meets a preset requirement, wherein the pre-start shooting unit is the shooting unit which detects that the first motion data reaches a first preset positive threshold; and
judging if the shooting device meets the starting condition according to a confirmation result.

13. The method according to claim 1, the device group is provided with a main shooting unit, wherein the judging if the shooting device meets the starting condition comprises:
if the shooting device detects that its motion parameter reaches the preset positive threshold, the shooting device sending a start judgment signal to the main shooting unit;
sending a starting command to other shooting devices in the device group if number of start judgment signals received by the main shooting device is greater than a preset value; and
the shooting device confirming that the shooting device meets the starting condition if the shooting device receives the starting command sent from the main shooting unit.

14. The method according to claim 1, the judging if the shooting device meets the starting condition comprises:
monitoring start judgment signals and starting commands sent from other shooting units in the device group, wherein any one of the shooting units in the device group sends a start judgment signal by broadcasting when it detects that its own first motion data reaches the first preset positive threshold, and any one of the shooting units in the device group sends a starting command by broadcasting when it detects that number of its received start judgment signals is greater than a preset value,
wherein if the shooting device receives the start judgment signal sent from other shooting units in the device group, it is confirmed that the shooting device meets the starting condition; or if the number of the start judgment signals received by the shooting device is greater than the preset value, it is confirmed that the shooting device meets the starting condition and the starting command is sent by broadcasting.

15. The method according to claim 10, the judging whether the video conforms to an upload standard comprises:
the shooting device comparing the video with a preset standard face image, judging whether the video conforms to the upload standard; and/or judging whether the video conforms to the upload standard according to a preset standard video parameter.

\* \* \* \* \*